(12) United States Patent
Ahmed et al.

(10) Patent No.: US 7,781,069 B2
(45) Date of Patent: *Aug. 24, 2010

(54) MOISTURE VAPOR PERMEABLE FILM INCLUDING ETHYLENE COPOLYMER AND ARTICLES INCLUDING THE SAME

(75) Inventors: Sharf U. Ahmed, Woodbury, MN (US); Peter Remmers, Hamburg (DE); Andualem W. Emiru, Woodbury, MN (US); Joachim Baumung, Deutsch Evern (DE)

(73) Assignee: H.B. Fuller Company, St. Paul, MN (US)

( * ) Notice: Subject to any disclaimer, the term of this patent is extended or adjusted under 35 U.S.C. 154(b) by 44 days.

This patent is subject to a terminal disclaimer.

(21) Appl. No.: 12/142,010

(22) Filed: Jun. 19, 2008

(65) Prior Publication Data

US 2008/0254270 A1 Oct. 16, 2008

Related U.S. Application Data

(63) Continuation of application No. 10/350,476, filed on Jan. 24, 2003, now Pat. No. 7,405,009.

(51) Int. Cl.
*B32B 27/00* (2006.01)
*B32B 27/08* (2006.01)
(52) U.S. Cl. .................. 428/500; 428/219; 428/515
(58) Field of Classification Search .................. None
See application file for complete search history.

(56) References Cited

U.S. PATENT DOCUMENTS

| 4,842,741 | A | 6/1989 | Coughlin et al. | |
| 7,405,009 | B2 * | 7/2008 | Ahmed et al. | ............... 428/522 |
| 2003/0024881 | A1 | 2/2003 | Kalthod | |

FOREIGN PATENT DOCUMENTS

JP 56-156086 4/1983

\* cited by examiner

*Primary Examiner*—Sheeba Ahmed

(57) ABSTRACT

A continuous film that includes ethylene copolymer selected from the group consisting of ethylene vinyl acetate, ethylene n-butylacrylate carbon monoxide, ethylene vinyl acetate carbon monoxide, and combinations thereof. The film exhibits a moisture vapor transmission rate of at least 100 g/m$^2$/day when measured according to MVTR Test Method I.

20 Claims, No Drawings

MOISTURE VAPOR PERMEABLE FILM INCLUDING ETHYLENE COPOLYMER AND ARTICLES INCLUDING THE SAME

CROSS REFERENCE TO RELATED APPLICATIONS

This is a continuing application of U.S. application Ser. No. 10/350,476, filed on Jan. 24, 2003, now U.S. Pat. No. 7,405,009, which is incorporated herein.

BACKGROUND

The invention is directed to preparing moisture vapor permeable ethylene copolymer films and articles.

Breathable films that are permeable to water vapor and impermeable to liquid are useful in a variety applications and are particularly well suited for use in disposable personal care and health care articles such as disposable diapers, adult incontinence products, feminine care absorbent products, training pants, garments and as coverings for a variety of articles. These films often provide the function of a breathable liquid impermeable barrier layer.

Breathable films exist in various forms. In one form, a breathable film includes micropores that form tortuous pathways through the film such that liquid placed in contact with one side of the film does not have a direct passage through the film to the opposite side of the film. The network of microporous channels in the film prevents liquids from passing through the film, but allows gases and water vapor to pass through the film.

In another form, a breathable film includes micropores that result from incorporating a filler, e.g., calcium carbonate, in the polymer melt, forming the polymer melt into a film, and then stretching the film. Stretching the film causes the polymer to break away from the particulate filler, which creates microporous passageways in the film. The additional processing steps required to make microporous films can increase the complexity and cost of the making the breathable film.

Breathable films can also result from the molecular structure of the polymer(s) of the film. Breathable polymers tend to have polar groups, e.g., hydrophilic groups. The polar groups of the polymer facilitate transfer of gas molecules or moisture vapor through the polymer film prepared from the breathable polymer. Breathable films have been prepared from various polymers including poly(vinyl alcohol), polyvinyl acetate, ethylene vinyl alcohol, polyurethane, ethylene methyl acrylate, ethylene methyl acrylic acid, block copolyester-copolyether, block copolyamide copolyether, and thermoplastic polyurethane.

Polymers that do not have hydrophilic groups or polar groups are considered to be non-breathable. In addition, polymers with relatively high amounts of hydrophobic groups and very small amounts of polar groups are also considered to be non-breathable. Copolymers such as ethylene vinyl acetate, ethylene n-butylacrylate carbon monoxide, and ethylene vinyl acetate carbon monoxide traditionally have been viewed as non-breathable.

Known breathable polymers tend to be more expensive than non-breathable polymers.

SUMMARY

The present inventors have made the surprising discovery of a film of ethylene copolymer selected from ethylene vinyl acetate copolymer, ethylene n-butylacrylate carbon monoxide copolymer, ethylene vinyl acetate carbon monoxide copolymer, and combinations thereof, exhibits a moisture vapor transmission rate of at least 100 g/m$^2$/day when measured according to the upright cup method of ASTM E-96.

The invention also features a pressure sensitive adhesive film that has a moisture vapor transmission rate of at least 100 g/m$^2$/day and that includes ethylene vinyl acetate copolymer, and a laminate that includes a continuous film described herein disposed on the nonwoven web and that exhibits a moisture vapor transmission rate of at least 100 g/m$^2$/day.

In one aspect, the invention features a continuous film that includes ethylene copolymer selected from the group consisting of ethylene n-butylacrylate carbon monoxide, ethylene vinyl acetate carbon monoxide, and combinations thereof, the film exhibiting a moisture vapor transmission rate of at least 100 g/m$^2$/day when measured according to MVTR Test Method I. In one embodiment, the continuous film consists essentially of ethylene copolymer selected from the group consisting of ethylene vinyl acetate, ethylene n-butylacrylate carbon monoxide, ethylene vinyl acetate carbon monoxide, and combinations thereof, the film exhibiting a moisture vapor transmission rate of at least 100 g/m$^2$/day when measured according to MVTR Test Method I. In other embodiments, the continuous film consists of ethylene copolymer selected from the group consisting of ethylene vinyl acetate, ethylene n-butylacrylate carbon monoxide, ethylene vinyl acetate carbon monoxide, and combinations thereof, the film exhibiting a moisture vapor transmission rate of at least 100 g/m$^2$/day when measured according to MVTR Test Method I.

In one embodiment, the film has an area weight of no greater than 25 g/m$^2$. In one embodiment, the film has an area weight of no greater than 15 g/m$^2$. In some embodiments, the film has an area weight of no greater than 10 g/m$^2$.

In some embodiments, the ethylene copolymer has a melt index of at least 50 g/10 min at 190° C. In other embodiments, the ethylene copolymer has a melt index of at least 100 g/10 min at 190° C. In another embodiments, the ethylene copolymer has a melt index of at least 400 g/10 min at 190° C.

In other embodiments, the film exhibits a moisture vapor transmission rate of at least 400 g/m$^2$/day when measured according to MVTR Test Method I. In one embodiment, the film exhibits a moisture vapor transmission rate of at least 600 g/m$^2$/day when measured according to MVTR Test Method I.

In some embodiments, the ethylene copolymer is ethylene vinyl acetate having a vinyl acetate content of at least 18%. In one embodiment, the ethylene copolymer is ethylene vinyl acetate having a vinyl acetate content of at least 25%. In other embodiments, the ethylene copolymer is ethylene vinyl acetate having a vinyl acetate content of from about 40% to about 85%. In another embodiment, the ethylene copolymer is ethylene vinyl acetate having a vinyl acetate content of from about 60% to about 85%.

In one embodiment, the ethylene copolymer consists of a first ethylene vinyl acetate copolymer and a second ethylene vinyl acetate copolymer different from the first ethylene vinyl acetate copolymer.

In another aspect, the invention features an article that includes a first layer and a second layer that includes a continuous film described herein bonded to the first layer. In one embodiment, the first layer includes a fibrous nonwoven web. In some embodiments, the first layer includes a porous substrate. In other embodiments, the first layer includes paper.

In one embodiment, a laminate is constructed to include an article described herein. In another embodiment, a disposable article is constructed to include an article described herein. In one embodiment, a layer of the disposable article is a nonwoven web.

In another embodiment, an article is constructed to include a disposable article described herein, wherein the article is selected from the group consisting of food packaging, product packaging, bed liners, mattress pads, mattress covers, disposable personal hygiene articles, diapers, bandages, sanitary napkins, tampons, undergarment liners, wound dressing, surgical drapes, surgical gowns, capes, infection control barriers, and table covers.

In another aspect, the invention features a continuous pressure sensitive adhesive film that includes ethylene vinyl acetate copolymer, and plasticizer and exhibits a moisture vapor transmission rate of at least 100 g/m$^2$/day when measured according to MVTR Test Method I. In one embodiment, the ethylene vinyl acetate copolymer has a vinyl acetate content of at least 40%. In other embodiments, the ethylene vinyl acetate copolymer has a vinyl acetate content of at least 60%. In some embodiments, the film further includes a second ethylene vinyl acetate copolymer, the second ethylene vinyl acetate copolymer being different from the first ethylene vinyl acetate copolymer.

In other embodiments, the continuous pressure sensitive adhesive film includes tackifying agent. In one embodiment, the continuous pressure sensitive adhesive film includes antioxidant.

In another embodiment, the film is a continuous pressure sensitive adhesive film consisting essentially of ethylene vinyl acetate copolymer having a vinyl acetate content of at least 25%, a second polymer different from the ethylene vinyl acetate copolymer, plasticizer; optionally tackifying agent and optionally antioxidant, wherein the film exhibits a moisture vapor transmission rate of at least 100 g/m$^2$/day when measured according to MVTR Test Method I. In one embodiment, the second polymer includes ethylene vinyl acetate. In other embodiments, the film includes no greater than 35% by weight the second polymer, the second polymer being selected from the group consisting of block copolymer, polyether amide, polyether ester, polyurethane, interpolymer of ethylene, polylactic acid, aromatic aliphatic copolyester, and combinations thereof.

In another aspect, the invention features a continuous film that includes ethylene vinyl acetate having a vinyl acetate content of at least 40%, has a thickness of no greater than 25 g/m$^2$, and exhibits a moisture vapor transmission rate of at least 100 g/m$^2$/day when measured according to MVTR Test Method I.

Other features and advantages will be apparent from the following description of the preferred embodiments and from the claims.

GLOSSARY

In reference to the invention disclosed herein, these terms having the meanings set forth below:

The term "a film consisting essentially of" means that to the extent that additional components are present in the film, the other components do not measurably alter the moisture vapor transmission rate of the film when measured according to the MVTR Test Method I.

DETAILED DESCRIPTION

The film is continuous such that it is free from micropores and pinholes and includes ethylene copolymers that include polar groups. Preferably the ethylene copolymers include randomly distributed polar groups. The film exhibits a moisture vapor transmission rate of at least 100 g/m$^2$/day when measured according to MVTR Test Method I, i.e., the upright cup method of ASTM E-96 B. Preferably the film exhibits a moisture vapor transmission rate of at least 200 g/m$^2$/day, more preferably at least 400 g/m$^2$/day, more preferably at least 500 g/m$^2$/day, more preferably at least 600 g/m$^2$/day, more preferably at least 800 g/m$^2$/day. Preferably the coat weight of the film is no greater than 25 g/m$^2$, more preferably no greater than 20 g/m$^2$, in some embodiments no greater than 15 g/m$^2$, in other embodiments no greater than 10 g/m$^2$, in other embodiments no greater than 5 g/m$^2$, in other embodiments from 1 g/m$^2$ to about 5 g/m$^2$.

The ethylene copolymers are water insoluble, i.e., they do not degrade or dissolve upon contact with water. The ethylene copolymers preferably exhibit a melt index of at least 2 g/10 min, in some embodiments at least 10 g/10 min, in other embodiments at least 50 g/10 min, in other embodiments at least 100 g/10 min, in other embodiments at least 500 g/10 min, in other embodiments at least 700 g/10 min, in other embodiments from about 10 g/10 min to about 850 g/10 min, in other embodiments from about 100 g/10 min to about 800 g/10 min, in other embodiments from about 150 g/10 min to about 800 g/10 min when measured according to ASTM D1238 at 190° C. In other embodiments, useful ethylene copolymers exhibit a melt index of from at least about 100 g/10 min, in other embodiments at least about 400 g/10 min, in other embodiments from about 100 g/10 min to about 850 g/10 min when measured according to ASTM D1238 at 125° C.

Suitable ethylene copolymers include, e.g., ethylene vinyl acetate carbon monoxide copolymers, ethylene n-butyl acrylate carbon monoxide copolymers, ethylene vinyl acetate copolymers, and blends thereof Useful ethylene vinyl acetate carbon monoxide copolymers are derived from ethylene monomers (preferably in an amount from about 50% by weight to about 80% by weight, more preferably from about 60% by weight to about 75% percent by weight), vinyl acetate monomer (preferably in an amount from about 10% by weight to about 30% by weight, more preferably from about 20% by weight to about 30% by weight), and carbon monoxide monomer (preferably in an amount from about 4% by weight to about 15% by weight, more preferably from about 8% by weight to about 10% by weight based on the weight of the copolymer). Suitable commercially available ethylene vinyl acetate carbon monoxide copolymers are available under the ELVALOY series of trade designations including, e.g., ELVALOY 742, from E.I. du Pont de Nemours and Company (Wilmington, Del.).

Useful ethylene n-butyl acrylate carbon monoxide copolymers are derived from ethylene monomer (preferably in an amount from about 50% by weight to about 80% by weight, more preferably from about 60% by weight to about 75% by weight), n-butyl acrylate monomer (preferably in an amount from about 5% by weight to about 40% by weight, more preferably from about 20% by weight to about 30% by weight), and carbon monoxide monomer (preferably in an amount from about 4% by weight to about 15% by weight, more preferably from about 8% by weight to about 15% by weight based on the weight of the copolymer). A useful commercially available ethylene n-butyl acrylate carbon monoxide copolymer is available under the trade designation ELVALOY HP771 from E.I. du Pont.

Useful ethylene vinyl acetate copolymers include a vinyl acetate content of at least 18% by weight, preferably at least 25% by weight, more preferably at least about 40% by weight, from about 40% by weight to about 85% by weight, more preferably from about 60% by weight to about 85% by weight. Suitable random copolymers of ethylene vinyl acetate are commercially available, e.g., under the trade designation ELVAX 205 from E.I. du Pont, under the ATEVA series of trade designations including ATEVA 1850A, 1880A, 2830A, 2850A and 4030AC from AT Plastics (Brampton, Ontario, Canada), under the EVATANE series of trade designations including, e.g., EVATANE 28-800 and 28-420 from AtoFina Chemicals (Philadelphia, Pa.), and under the LEVAMELT series of trade designations including, e.g., LEVAMELT 800 and LEVAMELT KA8896 from Bayer Corporation (Pittsburgh, Pa.).

The film can be formulated to exhibit pressure sensitive adhesive properties and a MVTR of at least 100 g/m$^2$/day. Preferably the pressure sensitive adhesive film includes ethylene vinyl acetate copolymer, plasticizer, and, optionally, tackifying agent, a second thermoplastic polymer, antioxidant and combinations thereof.

Examples of suitable plasticizers include citric acid esters (e.g., acetyl-tributyl citrate), benzoic acid esters (e.g., sucrose benzoate, 1,4-cyclohexane dimethanol dibenzoate, diethylene glycol/dipropylene glycol dibenzoate, dipropylene glycol dibenzoate and diethylene glycol dibenzoate where the mole fraction of hydroxyl groups which have been esterified ranges from 0.5 to 0.95; phthalates (e.g., dioctyl phthalate, butyl benzyl phthalate), phosphates, polyalkylene glycols (e.g., polyethylene glycol having a molecular weight less than 1000 and phenyl ethers of polyethylene glycol), dionyl phenol ethoxylates; ethoxylated bisphenol A; liquid rosin derivatives having ring and ball softening point less than 60° C.; phosphites such as t-butyl diphenyl phosphate; polyethylene glycol having a molecular weight below about 1000 and derivatives of polyethylene glycol (e.g., phenyl ethers of polyethylene glycol), toluene sulfonamide, and combinations thereof.

Useful commercially available plasticizers include plasticizers available under the following trade designations: CITROFLEX 2, CITROFLEX A-2, CITROFLEX 4 and CITROFLEX A-4 plasticizers from Morflex Inc. (Greensboro, N.C.); SANTICIZER 160 and SANTICIZER 154 t-butyl diphenyl phosphate from Monsanto (St. Louis, Mo.); DYNACOL 720 liquid plasticizer from Degussa (Piscataway, N.J.); liquid polymeric plasticizers from C.P. Hall (Chicago, Ill.); BENZOFLEX 352 1,4-cyclohexane dimethanol dibenzoate, BENZOFLEX 50 diethylene glycol/dipropylene glycol dibenzoate, BENZOFLEX P200 polyethylene glycol dibenzoate, BENZOFLEX 9-88 and BENZOFLEX 2088 dipropylene glycol dibenzoates, BENZOFLEX 400 polypropylene glycol dibenzoate, BENZOFLEX 2-45 diethylene glycol dibenzoate having from 0.5 to 0.95 mole faction esterified hydroxyl groups all from Velsicol (Rosemont, Ill.); PYCAL 94 phenyl ether of PEG from ICI (Wilmington, Del.), MACOL 206 EM ethoxylated bis phenol A from PPG Industries (Pittsburgh, Pa.), Sulfonic DNP dionyl phenol ethoxylates from Huntsman Chemical Corp. (Houston, Tex.); UNIPLEX 280 sucrose benzoate and UNIPLEX 214 and UNIPLEX 108 toluene sulfonamides from Unitex Chemical Corp. (Greensboro, N.C.); KETJENFLEX 8 from Akzo Nobel (Chicago, Ill.); and HERCOLYN D methyl ester of hydrogenated resin from Hercules (Wilmington, Del.).

Useful biodegradable plasticizers include citric acid esters and the plasticizers available under the CITROFLEX series of trade designations as set forth above.

When present, the plasticizer is present in the composition in an amount of no greater than 50% by weight, preferably no greater than about 40% by weight, more preferably from about 10% by weight to 35% by weight, most preferably from about 15% by weight to about 30% by weight.

Suitable tackifying agents are generally polar in nature and have a Ring and Ball softening point greater than 60° C., examples of which include natural and modified rosins such as gum rosin, wood rosin, tall oil rosin, distilled rosin, hydrogenated rosin, dimerized rosin and polymerized rosin; rosin esters such as glycerol and pentaerythritol esters of natural and modified rosins including, e.g., glycerol esters of pale, wood rosin, glycerol esters of hydrogenated rosin, glycerol esters of polymerized rosin, pentaerythritol esters of hydrogenated rosin and phenolic-modified pentaerythritol esters of rosin; phenolic modified terpene or alpha methyl styrene resins and hydrogenated derivatives thereof including, e.g., the resin product resulting from the condensation in an acidic medium of a bicyclic terpene and a phenol; aliphatic petroleum hydrocarbon resins having a Ball and Ring softening point of from about 70° C. to 135° C.; the latter resins resulting from the polymerization of monomers consisting primarily of olefins and diolefins; including hydrogenated aliphatic petroleum hydrocarbon resins; aromatic petroleum hydrocarbon resins, and mixed aromatic and aliphatic paraffin hydrocarbon resins and the hydrogenated derivatives thereof; aromatic modified alicyclic petroleum hydrocarbon resins and the hydrogenated derivatives thereof; alicyclic petroleum hydrocarbon resins and the hydrogenated derivatives thereof; low molecular weight polylactic acid; and combinations thereof.

Examples of useful commercially available tackifying agents include resins available under the trade designations FORAL NC, KRISTALEX (e.g., KRISTALEX 3100 hydrocarbon resin) and ENDEX from Hercules (Wilmington, Del.), non-ionic tackifying resins such as FORAL AX and FORAL 85 from Hercules, URATAK 68520 alpha methyl styrene phenolics from DSM Resins (Panama City, Fla.), UNITAC R100L rosin esters from Union Camp, SYLVAREZ TP 300 and SYLVAREZ TP 2040 terpene phenolic tackifying resins from Arizona Chemical (Panama City, Fla.), and CHRONOPOL PLA low molecular weight tacky polylactic acid from Chronopol Inc. (Golden, Colo.).

Preferably the type and amount of tackifying agent added to the composition is sufficient to increase the tack of the composition, to facilitate composition processing and combinations thereof. When present, the tackifying agent is present in the composition in an amount of no greater than about 25% by weight, preferably no greater than 20% by weight, most preferably from about 5% by weight to about 15% by weight.

One example of a suitable second thermoplastic polymer is an ethylene vinyl acetate copolymer that exhibits at least one of a different melt index and a different vinyl acetate content relative to the first ethylene vinyl acetate copolymer of the film. Useful ethylene vinyl acetate copolymers include, e.g., the ethylene vinyl acetate copolymers described above and ethylene vinyl acetate copolymers exhibiting a melt index from 2 g/10 min to about 800 g/10 min at 190° C.

Examples of other suitable thermoplastic polymers include polyether-polyester block copolymers examples of which are commercially available under the HYTREL series of trade designations including, e.g., HYTREL G 3548 and 8171, from E.I. duPont de Nemours and Company, polyether-polyamide block copolymers, examples of which are commercially available under the PEBAX series of trade designations including, e.g., PEBAX 2533, from AtoFina Chemicals (Philadelphia, Pa.), thermoplastic polyurethane polymers, examples of which are commercially available under the ESTANE series of trade designations including, e.g., ESTANE 58245, from Noveon (Cleveland, Ohio), polylactic acid polymers, examples of which are commercially available from Cargill Corp. (Minnetonka, Minn.), polymers available under the DYNACOL and DYNAPOL trade designations from Degussa AG (Germany), biodegradable copolyesters including those copolyesters available under the EASTAR BIO series of trade designations from Eastman Chemical (Kingsport, Tenn.), various block copolymers including, e.g., A-B-A triblock copolymers, A-B diblock copolymers, (A-B)n radial block copolymers, and branched and grafted versions thereof. The A blocks are nonelastomeric polymer blocks (e.g., styrene), and the B blocks are unsaturated conjugated diene or hydrogenated versions thereof. Examples of useful B blocks include isoprene, butadiene, ethylene/butylenes (hydrogenated butadiene), ethylene/propylene (hydrogenated isoperene), and mixtures thereof. Suitable block copolymers are commercially available under the KRATON D and G series of trade designations from Kraton Polymers (Houston, Tex.), the EUROPRENE SOL T series of trade designations from Enichem (Houston, Tex.) and the VECTOR series of trade designations from Exxon Chemical (Houston, Tex.).

The second polymer preferably is present in the composition in an amount no greater than about 35% by weight, in other embodiments no greater than 20% by weight, in other embodiments no greater than 15% by weight, in other embodiments no greater than 10% by weight, in other embodiments no greater than about 5% by weight.

Examples of useful commercially available antioxidants include antioxidants available under the trade designations IRGANOX 1010 and 1076 from Ciba Specialty Chemicals (Tarrytown, N.Y.).

The film can also include additives including, e.g., antislip agents.

The film is suitable for use in a variety of applications and constructions including, e.g., textiles, laminates, textile laminates, disposable packaging including, e.g., food and product packaging, bed liners, mattress pads, mattress covers, disposable personal hygiene articles including, e.g., bandages, diapers, sanitary napkins, tampons and undergarment liners, other articles including, e.g., wound dressing, surgical drapes and surgical gowns, capes, infection control barriers, and table covers including, e.g., examining table covers, gurneys, and tables used in hospitals and clinics. The film can be coated on a variety of substrates including, e.g., release liners, fibrous webs, woven and nonwoven webs, paper, textile fabrics, tissues, and combinations thereof.

The continuous film can be applied to a substrate or formed on a substrate. The continuous film can be applied as a continuous coating or a discontinuous coating including, e.g., pattern, strips, dots, and randomly, using a variety of techniques including, e.g., hot melt coating, extrusion, laminating, and combinations thereof. An example of a useful coating method includes rendering a composition flowable, i.e., melting the composition, and releasing the composition from a coating device, e.g., a slot die coater, onto a substrate, without contact between the coating device and the substrate. Useful coating methods are also described, e.g., in U.S. Pat. No. 5,827,252, U.S. Pat. No. 6,120,887 and WO 99/28048, and incorporated herein.

The invention will now be described by way of the following examples.

EXAMPLES

Test Procedures

Test procedures used in the examples include the following.

Moisture Vapor Transmission Rate (MVTR) Test Method I

Moisture vapor transmission rate is determined according to the water method of ASTM E 96 B entitled, "Standard Test Methods for Water Vapor Transmission of Materials," upright cup method (which is incorporated herein) at 73° F. The results are reported in g/m²/day.

Moisture Vapor Transmission Rate (MVTR) Test Method II

Moisture vapor transmission rate is determined according to ASTM D6701, which is incorporated herein, using a Mocon Instrument Model 100K MVTR tester (Mocon, Minneapolis, Minn.). The results are reported in g/m²/day.

Melt Viscosity

The melt viscosity is determined using a Brookfield Viscometer Model DVII using a number 27 spindle.

180° Peel Adhesion to Stainless Steel

The 180° peel adhesion is determined according to PSTC-1 180° Peel Adhesion Test Method (12$^{th}$ Edition), which is incorporated herein. A film having a thickness from 1 mil to 2 mil is coated onto one side of a MYLAR polyester film. Strips of film, 1 in.×8 in. in dimension, are cut from the sample for use in the test method. The results are reported in unites of pounds (lbs).

Loop Tack Testing

An adhesive sample is coated in the form of a film having a thickness from 1 mil to 2 mil on MYLAR polyester film. A release liner is then applied to the exposed surface of the adhesive film and the construction is cut into 1 in.×5 in. strips. A test sample is then inserted in a CHEMSULTANTS International Loop Tack Tester with the adhesive facing out (release liner removed) and tested. The Loop Tack Tester automatically records the tack value. The results are reported in unites of pounds (lbs).

Example 1

A melt of ATEVA 2830A ethylene vinyl acetate copolymer having a vinyl acetate content of 28% and a melt index of 150 g/10 min when measured according to ASTM D1238 at 125° C. (as reported by the manufacturer) (AT Plastic) was drawn down as a film having a thickness of 2 mil onto a release liner or a polyester film using a heated draw bar. The film was then tested according to the MVTR Test Method I. A second film having a thickness of 1.2 mil was prepared and tested according to MVTR Test Method II. The results, normalized to a 1 mil thickness, are reported in Table 1.

Example 2

Multiple pieces of film were prepared by drawing down a melt of ATEVA 2850A ethylene vinyl acetate copolymer having a vinyl acetate content of 28% and a melt index range of from 820 g/10 min to 850 g/10 min when measured according to ASTM D1238 at 125° C. (as reported by the manufacturer) (AT Plastic) in the form of film having a thickness of 3 mil onto a release liner or a polyester film using a heated draw bar. The film was then tested according to the MVTR Test Method I. A second film having a thickness of 2 mil was prepared in the same manner and tested according to MVTR Test Method II. The results were normalized to a 1 mil film thickness and the average result is reported in Table 1.

Example 3

Multiple pieces of film were prepared by drawing down a melt of ATEVA 1850A ethylene vinyl acetate copolymer having a vinyl acetate content of 18% and a melt index of 150 g/10 min when measured according to ASTM D1238 at 190° C. (as reported by the manufacturer) (AT Plastic) in the form of films having thickness of from 3 mil to 4 mil onto a release liner or a polyester film using a heated draw bar. The film was then tested according to MVTR Test Method I. The results were normalized to a mil film thickness and the average result is reported in Table 1.

Example 4

LEVAMELT 800 ethylene vinyl acetate copolymer having a vinyl acetate content of 80% and a melt index of from 2 g/10 min to 6 g/10 min at 190° C. (as reported by the manufacturer) (Bayer AG) was dissolved in toluene and cast onto a release paper or a MYLAR polyester film to form an ethylene vinyl acetate film having a thickness of 1 mil. The film was then tested according to MVTR Test Method I. The results are reported in Table 2. A second film having a thickness of 1.2 mil was prepared in the same manner and tested according to MVTR Test Method II. The result was normalized to a 1 mil film thickness and is reported in Table 1.

Example 5

LEVAMELT KA8896 ethylene vinyl acetate copolymer having a vinyl acetate content of 68% and a melt index of from 15 g/10 min to 35 g/1 min at 190° C. (as reported by the manufacturer) (Bayer AG) was dissolved in toluene and cast onto a release paper or a MYLAR polyester film to form an ethylene vinyl acetate film having a thickness of 1.2 mil. The film was then tested according to MVTR Test Method II. The result was normalized to a 1 mil film thickness and is reported in Table 1.

Example 6

ELVALOY 771 ethylene-n-butyl acrylate carbon monoxide terpolymer E/nBA/CO 64/26/10 having a melt index of 100 g/10 min at 190° C. (as reported by the manufacturer) (E.I. du Pont) was melted in a forced air oven and drawn down onto a release paper to form an ethylene-n-butyl acrylate carbon monoxide terpolymer film having a thickness of from 2 mil. The film was then tested according to MVTR Test Method I. The result was normalized to a 1 mil film thickness and is reported in Table 1. A second film having a thickness of 1.2 mil was prepared in the same manner and tested according to MVTR Test Method II. The result was normalized to a 1 mil film thickness and is reported in Table 1.

Example 7

A melt of ATEVA 2850A ethylene vinyl acetate copolymer having a vinyl acetate content of 28% and a melt index of 850 g/10 min when measured according to ASTM D1238 at 125° C. (as reported by the manufacturer) (AT Plastic) was coated in the form of a continuous film at a coating weight of 10 g/m² onto a COROSOFT nonwoven web of spunbonded fibers having a basis weight of 23 g/m² to form a laminate. The laminate was then tested according to MVTR Test Methods I and II. The results are reported in Table 1.

Example 8

A melt of ATEVA 2830A ethylene vinyl acetate copolymer having a vinyl acetate content of 28% and a melt index of 150 g/10 min when measured according to ASTM D1238 at 125° C. (as reported by the manufacturer) (AT Plastic) was coated in the form of a continuous film at a coating weight of 15 g/m² onto a COROSOFT nonwoven web of spunbonded fibers having a basis weight of 23 g/m² to form a laminate. The laminate was then tested according to MVTR Test Methods I and II. The results are reported in Table 1.

TABLE 1

| Sample | MVTR Test Method I (g/m²/day) | MVTR Test Method II (g/m²/day) |
| --- | --- | --- |
| 1 | 138 | 460 |
| 2 | 240 | 536 |
| 3 | 120 | NT |
| 4 | 436 | 488 |
| 5 | NT | 183 |
| 6 | 648 | 656 |
| 7 | 350 | 1354 |
| 8 | 128 | 600 |

NT = not tested

Examples 9-20

The films of Examples 9-20 were prepared by melting the ingredients listed in Table 2 in a glass jar or a metal can, placing the sample in a forced air oven at 350° F. and then mixing the samples at 350° F. for from 30 minutes to one hour until the composition was smooth. The amounts listed in Table 1 are in grams. Each composition was drawn down as a film having a thickness of from 1 mil to 2 mil on release paper or MYLAR polyester film using a heated draw bar.

The films of Examples 9, 10 and 13-19 were tested according to the MVTR Test Method I. The films of Examples 9-12, 17, 18 and 20 were tested according to the Loop Tack Test Method and the 180° Peel Value Test Method. The results are reported in Table 2. The reported MVTR results for Examples 9, 10 and 13-19 have been normalized to a 1 mil film thickness.

The compositions of Examples 11, 12 and 20 were coated on a release liner at a film thickness of 1.5 mil. A spun bonded nonwoven backing having an area weight of 24 g/m² was placed on top of the film. A 4.5 lb roller was rolled over the nonwoven to bond the sample film to the nonwoven. The composite was then removed from the release paper and measured according to MVTR Test Method I. The results are reported in Table 2.

TABLE 2

| Component | 9 | 10 | 11 | 12 | 13 | 14 | 15 | 16 | 17 | 18 | 19 | 20 |
| --- | --- | --- | --- | --- | --- | --- | --- | --- | --- | --- | --- | --- |
| LEVAMELT KA8896[1] | 65.5 | 64.5 | 55.5 | 32.5 | — | — | — | — | 50 | 55 | — | 52.6 |
| LEVAMELT 800[2] | — | — | — | 32.0 | 70.0 | 70.0 | 70.0 | 64.5 | — | — | — | — |
| ATEVA 4030AC EVA 40-55[3] | — | — | 14.0 | — | — | — | — | — | — | — | — | — |
| EVATANE 28-800[4] | — | — | — | — | — | — | — | — | — | — | 82.7 | — |
| AC 400[5] | — | — | — | — | — | — | — | — | — | — | 1.33 | — |

TABLE 2-continued

| Component | 9 | 10 | 11 | 12 | 13 | 14 | 15 | 16 | 17 | 18 | 19 | 20 |
|---|---|---|---|---|---|---|---|---|---|---|---|---|
| ELVAX 410[6] | — | — | — | — | — | — | — | — | — | — | 0.664 | — |
| KRATON G 1726[7] | — | — | — | — | — | — | — | — | — | — | — | 5.3 |
| HYTREL G3548[8] | — | — | — | — | — | — | — | — | 10 | 5 | — | — |
| KRISTALEX 3100[9] | — | 5.0 | — | 5.0 | — | — | — | — | 14.5 | 14.5 | — | 15.3 |
| FORAL AX E[10] | — | — | — | — | — | — | — | — | — | — | 10.0 | — |
| BENZOFLEX XP-3202[11] | — | — | — | — | 30.0 | — | — | 15 | — | — | — | — |
| BENZOFLEX P200[12] | 30.0 | 30.0 | 30.0 | — | — | 30.0 | — | — | 25 | — | — | 26.3 |
| BENZOFLEX 20-88[13] | — | — | — | 30.00 | — | — | — | — | — | 25 | — | — |
| BENZOFLEX 50[14] | — | — | — | — | — | — | — | — | — | — | 5.0 | — |
| CITROFLEX-2[15] | — | — | — | — | — | — | 30.0 | 20.0 | — | — | — | — |
| IRGANOX 1010[16] | 0.5 | 0.5 | 0.5 | 0.5 | — | — | — | 0.5 | 0.5 | 0.5 | 0.152 | 0.5 |
| IRGANOX PS800[17] | — | — | — | — | — | — | — | — | — | — | 0.152 | — |
| LOWINOX BHT[18] | — | — | — | — | — | — | — | — | — | — | 0.002 | — |
| Loop Tack (lbs) | 1.93 | 3.05 | 1.42 | 1.29 | NT | NT | NT | NT | 0.83 | 2.7 | NT | 1.5 |
| 180° Peel (lbs) | 2.81 | 4.06 | 3.38 | 1.93 | NT | NT | NT | NT | 1.33 | 3.7 | NT | 5.5 |
| MVTR G/m²/day | 867 | 687 | 240 | 504 | 1056 | 896 | 1324 | 986 | 168 | 177 | 450 | 336 |

NT = not tested
[1]LEVAMELT KA8896 ethylene vinyl acetate copolymer having a vinyl acetate content of 68% and a melt index of from 15 g/10 min to 35 g/10 min at 190° C. (as reported by the manufacturer) (Bayer AG)
[2]LEVAMELT 800 ethylene vinyl acetate copolymer having a vinyl acetate content of 80% and a melt index of from 2 g/10 min to 6 g/10 min at 190° C. (as reported by the manufacturer) (Bayer AG)
[3]ATEVA 4030AC ethylene vinyl acetate copolymer having a vinyl acetate content of 40% and a melt index of 55 g/10 min when measured according to ASTM D1238 at 190° C. (as reported by the manufacturer) (AT Plastics Inc., Ontario, Canada)
[4]EVATANE 28-800 ethylene vinyl acetate copolymer having a vinyl acetate content of from 27% to 29% and a melt index of from 700 to 900 g/10 min (as reported by the manufacturer) AtoFina Chemicals (Philadelphia, PA)
[5]AC 400 ethylene vinyl acetate copolymer having a vinyl acetate content of 13% (Honeywell, Tarrytown, NJ)
[6]ELVAX 410 ethylene vinyl acetate copolymer having a vinyl acetate content of 18% and a melt index of 500 g/10 min as reported by the manufacturer (DuPont)
[7]KRATON G 1726 styrene ethylene-butylene styrene block copolymer including 30% by weight styrene (Kraton Polymers, Houston, Texas)
[8]HYTREL G3548 polyether polyester copolymer elastomer (E.I. du Pont de Nemours & Co)
[9]KRISTALEX 3100 hydrocarbon resin (Eastman Chemical Company, Kingsport, Tennessee)
[10]FORAL AX-E fully hydrogenated rosin (Eastman Chemical Company)
[11]BENZOFLEX XP-3202 plasticizer (Velsicol Chemical Corporation, Rosemont, Illinois)
[12]BENZOFLEX P200 polyethylene glycol dibenzoate plasticizer (Velsicol Chemical Corporation)
[13]BENZOFLEX 2088 benzoate plasticizer (Velsicol Chemical Corporation)
[14]BENZOFLEX 50 50/50 blend of diethylene glycol dibenzoate and dipropylene glycol dibenzoate (Velsicol Chemical Corporation)
[15]CITROFLEX-2 plasticizer (Morflex, Inc.)
[16]IRGANOX 1010 antioxidant (Ciba Specialty Chemicals Corporation, Tarrytown, New York)
[17]IRGANOX PS 800 antioxidant (Ciba Specialty Chemicals Corporation, Tarrytown, New York)
[18]LOWINOX BHT antioxidant (Great Lakes Chemical, West Lafayette, Indiana)

Other embodiments are within the claims.

What is claimed is:

1. A continuous film consisting essentially of:
   ethylene vinyl acetate copolymer,
   a second polymer other than an ethylene vinyl acetate copolymer, the second polymer selected from the group consisting of a block copolymer, a polyether polyamide, a polyether polyester, a aromatic aliphatic copolyester, a polyurethane, an interpolymer of ethylene, a polylactic acid, and combinations thereof, and
   optionally plasticizer,
   said film exhibiting a moisture vapor transmission rate of at least 100 g/m²/day when measured according to MVTR Test Method I.

2. The film of claim 1, wherein the second polymer comprises aromatic aliphatic copolyester polymer.

3. The film of claim 2, wherein said plasticizer is present and is selected from the group consisting of citric acid esters, benzoic acid esters and combinations thereof.

4. The film of claim 1, wherein said plasticizer is present and is selected from the group consisting of citric acid esters, benzoic acid esters, and combinations thereof.

5. The film of claim 1, further comprising tackifying resin.

6. The film of claim 1, wherein said film has an area weight of no greater than 15 g/m².

7. The film of claim 1, wherein said film has an area weight of no greater than 10 g/m².

8. The film of claim 1, wherein said ethylene vinyl acetate copolymer has a melt index of at least 50 g/10 min at 190° C.

9. The film of claim 1, wherein said ethylene vinyl acetate copolymer has a melt index of at least 100 g/10 min at 190° C.

10. The film of claim 1, wherein said film exhibits a moisture vapor transmission rate of at least 400 g/m²/day when measured according to MVTR Test Method I.

11. The film of claim 1, wherein said film exhibits a moisture vapor transmission rate of at least 600 g/m²/day when measured according to MVTR Test Method I.

12. An article comprising:
a first layer; and
a second layer comprising the continuous film of claim 1 bonded to said first layer.

13. The article of claim 12, wherein said first layer comprises at least one of a fibrous nonwoven web and paper.

14. A continuous pressure sensitive adhesive film consisting essentially of:
  a. a first ethylene vinyl acetate copolymer having a vinyl acetate content of at least 25%;
  b. a second polymer different from said first ethylene vinyl acetate copolymer;
  c. plasticizer; and
  d. optionally, tackifying agent; and
  e. optionally, antioxidant,
  said film exhibiting a moisture vapor transmission rate of at least 100 g/m²/day when measured according to MVTR Test Method I.

15. The pressure sensitive adhesive film of claim 14, wherein said second polymer comprises ethylene vinyl acetate.

16. The pressure sensitive adhesive film of claim 14 comprising from about 5% by weight to about 15% by weight said tackifying agent.

17. The pressure sensitive adhesive film of claim 14, wherein said second polymer comprises aromatic aliphatic copolyester.

18. The pressure sensitive adhesive film of claim 17 comprising from about 5% by weight to about 15% by weight said tackifying agent.

19. The pressure sensitive adhesive film of claim 14, comprising no greater than 35% by weight said second polymer, said second polymer being selected from the group consisting of a block copolymer, a polyether polyamide, a polyether polyester, an aromatic aliphatic copolyester, a polyurethane, an interpolymer of ethylene, a polylactic acid, and combinations thereof.

20. The pressure sensitive adhesive film of claim 14, wherein said film exhibits a moisture vapor transmission rate of at least 400 g/m²/day when measured according to MVTR Test Method I.

* * * * *